United States Patent [19]  [11] Patent Number: 4,572,998
Nozawa et al.  [45] Date of Patent: Feb. 25, 1986

[54] TOOL RADIUS COMPENSATION SYSTEM

[75] Inventors: Ryoichiro Nozawa, Tokyo; Hideaki Kawamura; Mitsuto Miyata, both of Hachioji, Japan

[73] Assignee: Fanuc Limited, Minamitsuru, Japan

[21] Appl. No.: 484,254

[22] Filed: Apr. 12, 1983

[30] Foreign Application Priority Data

Apr. 16, 1982 [JP] Japan ................................ 57-63310

[51] Int. Cl.$^4$ ............................................ G05B 19/24
[52] U.S. Cl. ..................................... 318/572; 318/570; 318/571
[58] Field of Search ........................ 318/570, 571, 572

[56] References Cited

U.S. PATENT DOCUMENTS 3,007,096 10/1961 Tripp ..................................... 318/571
3,148,317 9/1974 Tripp ..................................... 318/571
3,766,369 10/1973 Watanabe et al. ............. 235/151.11

FOREIGN PATENT DOCUMENTS 0075022 3/1983 European Pat. Off. .
0081590 6/1983 European Pat. Off. .
2514912 4/1983 France .

OTHER PUBLICATIONS

European Search Report, completed 7/25/83, by Examiner Ressenaar, at The Hague.

Primary Examiner—William M. Shoop, Jr.
Assistant Examiner—Saul M. Bergmann
Attorney, Agent, or Firm—Staas & Halsey

[57] ABSTRACT

A system in which the radius of a tool is compensated for in the three-dimensional machining of a workpiece, wherein a tool is offset from a commanded tool path by a distance commensurate with the tool radius. Machining is performed by commanding the contour of the workpiece as a tool path in a prescribed plane sectioning the workpiece, providing the value of the tool radius and the angle of inclination of a machined surface of the workpiece, computing a first tool offset quantity in the prescribed plane and a second tool offset quantity in a direction at right angles to the prescribed plane, based on the radius of the tool and the angle of inclination, compensating for the radius of the tool in the prescribed plane based on the first tool offset quantity, correcting the position of the tool in a direction at right angles to the prescribed plane based on the second tool offset quantity, and machining the workpiece in three dimensions based on the compensated tool radius in the prescribed plane and the corrected tool position in the direction at right angles to the prescribed plane.

3 Claims, 4 Drawing Figures

TOOL RADIUS COMPENSATION SYSTEM

BACKGROUND OF THE INVENTION

This invention relates to a tool radius compensation system and, more particularly, to an apparatus and method useful in compensating for the radius of a tool in a three-dimensional machining operation.

A numerical control device usually comes equipped with a tool radius compensation function. Compensation of tool radius is accomplished by moving the center of a tool along a path that is offset to the left or right of a programmed path by a distance equivalent to the tool radius, thereby compensating for a cutting error attributed to the radius. For example, with reference to FIG. 1, assume that a programmed path is defined by two straight lines L1, L2 which intersect at an angle $\alpha$ of between 90° and 180°. The tool radius is compensated for in this case by prereading a move command located in the present block of data $b_1$ and a move command located in the next block of data $b_2$, deriving straight lines L1', L2' obtained by offsetting the straight lines L1, L2 in the respective blocks $b_1$, $b_2$ by the tool radius (offset quantity) r, and computing the coordinates of the point S1 at which L1' and L2' intersect. Then, when the tool is transported by a pulse distribution operation from an end point So in the previous block to the end point S1 in the present block, the center of the tool will traverse a path offset by the radius r from the correctly commanded programmed path, causing the workiece to be machined in the manner commanded.

Providing a numerical control device with a tool radius compensation function of the kind described simplifies programming immensely because the programmer need not take tool radius into consideration when creating a numerical control tape. Moreover, when tool radius changes owing to wear or because one tool has been substituted for another, the operator need only set the value of the new radius using a radius setting dial provided on an NC panel, or enter the new radius value by means of a manual data input unit (referred to as an MDI). Either of these operations stores the new value in memory so that machining can be performed correctly based thereon.

The case described above relates to a tool radius compensation performed in two dimensions. For a three-dimensional radius compensation, data indicating the amount of compensation along each of three axes must be included in each block of data, unlike the foregoing case for two dimensions. This makes it impossible to create an NC tape that includes three-dimensional offset data without making use of an automatic programming apparatus.

With regard to the last-mentioned point, there is available a so-called 2½-dimensional machining method which combines two-dimensional contour machining and a so-called pick-feed operation to achieve three-dimensional machining of a workpiece. In such 2½-dimensional machining, moreover, there are cases where, during the machining of a contour defined by sectioning the workpiece by a predetermined plane, there is almost no change in the inclination of the machined surface along said contour. In cases such as these, where it is unnecessary to specify compensation direction in each and every block of data, programming in three-dimensions is quite feasible without relying upon an automatic programming apparatus and without the laborious task of designating compensation direction block for block.

SUMMARY OF THE INVENTION

An object of the present invention is to provide a tool radius compensation apparatus and method wherein it is unnecessary to specify compensation direction in each block of a program when the inclination of a workpiece surface being machined, relative to a plane defining the contour of the workpiece, exhibits almost no change during the machining of said contour.

Another object of the present invention is to provide a tool radius compensation apparatus and method for use in three-dimensional machining, wherein programming can be carried out simply and inexpensively, without relying upon a costly automatic programming apparatus, when the surface of workpiece being machined exhibits a constant inclination or slope.

According to the present invention, the foregoing objects are attained by providing a system in which the radius of a tool is compensated for in the three-dimensional machining of a workpiece, wherein a tool is offset from a commanded tool path by a distance commensurate with the tool radius. The system includes command means for producing X-, Y- and Z-axis command signals, of which the X- and Y-axis command signals specify a workpiece contour as a tool path in an X-Y plane sectioning the workpiece. Means are provided for supplying the tool radius and the inclination of a machined surface of the workpiece, on the basis of which an arithmetic unit computes a first tool offset quantity in the X-Y plane and a second tool offset quantity in a direction at right angles to the prescribed plane, i.e., along the Z-axis. Two-dimensional tool radius compensation means receives the X-and Y-axis command signals from the command means for effecting tool radius compensation in the X-Y plane by correcting the X- and Y-axis command signals based on the first tool offset quantity, and for delivering the corrected X- and Y-axis command signals. Z-axis tool radius compensation means receives the Z-axis command signal from the command means for correcting tool position along the Z-axis, which lies at right angles to the X-Y plane, by correcting the Z-axis command signal based on the second tool offset quantity, and for delivering the corrected Z-axis command signal. The corrected X-, Y- and Z-axis command signals are applied to means for machining the workpiece in three dimensions based on these signals.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
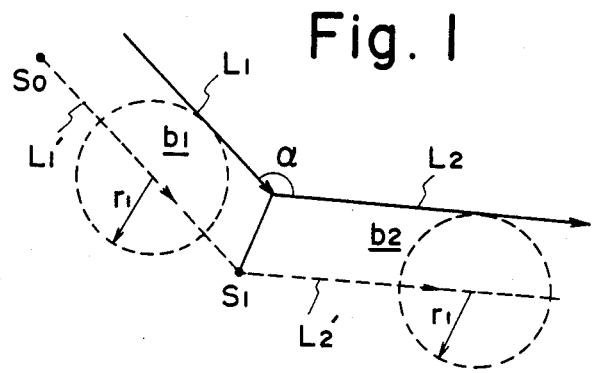
FIG. 1 is a diagram useful in describing a conventional method of compensating for tool radius in two-dimensional machining.
Figure 2:
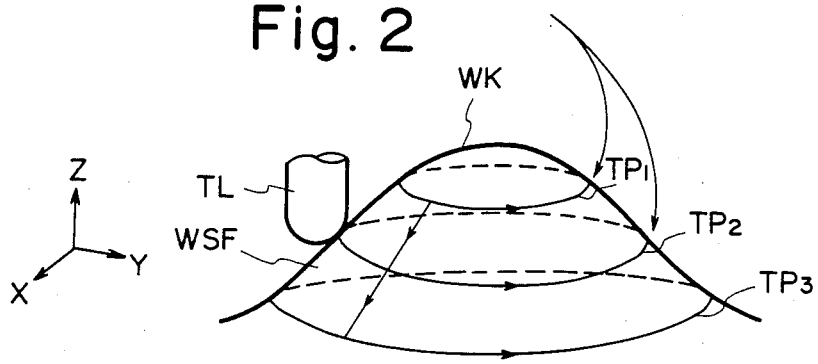
FIG. 2 is a diagram useful in describing a method of compensating for tool radius according to the present invention.
Figure 3:
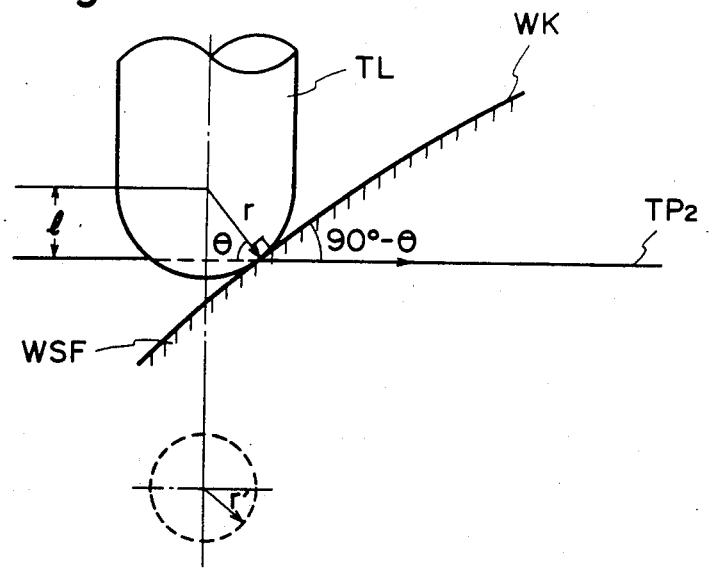
FIG. 3 is a diagram representing a partial enlargement of the diagram shown in FIG. 2.

Referring to FIGS. 2 and 3, TL denotes a cutting tool for machining a workpiece WK. The nose of the tool TL has the shape of a hemisphere of radius r. The workpiece surface WK will have a gently sloping surface WSF when machined. When the workpiece WK is sectioned by a predetermined plane, the inclination of the workpiece surface WSF along the resulting contour (section) will be constant.

Machining of the workpiece WK is accomplished by moving the tool TL first along the contour TP1 in FIG. 2, subsequently moving the tool TL from the contour TP1 to the contour TP2, and then moving the tool along the contour TP2. Repeatedly shifting the tool TL from one contour to another by the pick-feed operation and then machining each contour in the manner described makes it possible to machine the workiece three-dimensionally. The contours TP1, TP2, TP3 . . . are commanded in the form of a tool path, and the pick-feed increment is a given quantity.

According to the present invention, the radius of the cutting tool is compensated for in the following manner when the machined workpiece surface WSF has a constant inclination. First, as shown in the partially enlarged view of FIG. 3, let r represent the tool radius, let the inclination of the surface WSF at the contour TP2 (the commanded tool path) be $90° - \theta$, let r' represent a first offset quantity in a plane (the X-Y plane) containing the contour TP2, and let l represent a second offset quantity in a direction (along the Z axis) at right angles to said plane. Tool radius compensation according to the invention will then be performed by computing actual values for the first and second offset quantities r', l, and effecting compensation based on the computed values. It will apparent from FIG. 3 that r' and l may be expressed as follows:

$$r' = r \cdot \cos\theta \qquad \ldots (1)$$

$$l = r \cdot \sin\theta \qquad \ldots (2)$$

Therefore, according to the invention, the first and second offset quantities r', l are computed from Eqs. (1), (2), respectively, and the tool position is corrected by l ($= r \cdot \sin\theta$) along the Z axis when performing the pick-feed. The move command effective in the X-Y plane is corrected based on the first offset quantity r', and the tool TL is transported in accordance with the corrected move command in such a manner that the center of the tool will traverse a path offset by r' ($= r \cdot \cos\theta$) from the commanded tool path.

Figure 4:
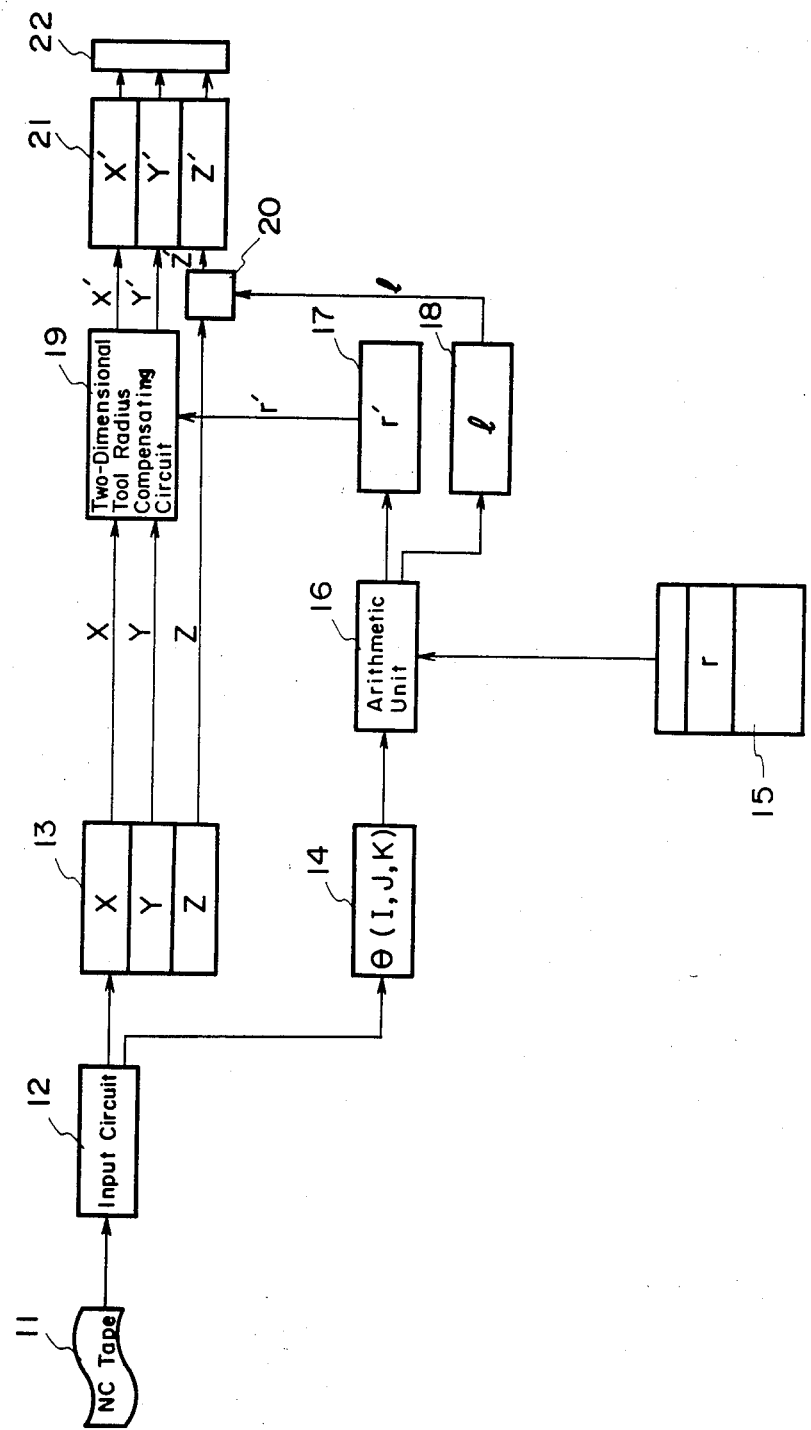
FIG. 4 is a block diagram illustrating an embodiment of an apparatus for tool radius compensation according to the present invention.

Reference will now be had to the block diagram of FIG. 4 showing an embodiment of an apparatus for practicing tool radius compensation according to the present invention. An NC tape 11 has numerical control information recorded thereon. An input circuit 12 has means for reading the NC information from the tape 11 and for decoding the information into signals applied to registers 13, 14. The register 13 stores amounts of movement received as move commands X, Y, Z from the input circuit 12. The register 14 stores the inclination angle 0 of the machined surface WSF. Note that the inclination can also be given by normal vectors I, J and K. Numeral 15 denotes a register for storing tool radius. The output of register 15 is applied to an arithmetic circuit 16 for computing the first and second offset quantities r', l by performing the operations specified by Eqs. (1) and (2). Registers 17, 18 store the offset quantities r', l, respectively. A two-dimensional tool radius compensation circuit 19 receives the move commands X, Y from the register 13 and the first offset quantity r' from the register 17 and corrects the commanded tool path in the X-Y plane based on r', producing signals indicative of corrected amounts of movement X', Y'. A Z-axis tool radius compensation circuit 20 receives the move command Z from the register 13 and the second offset quantity l from the register 18 and effects a positional compensation along the Z axis by correcting the Z-axis move command Z based on the quantity l, producing a signal indicative of a corrected amount of movement Z'. A register 21 stores the corrected amounts of movement X', Y', Z' and delivers them to a pulse distributor 22. The latter uses the value Z' after a pick feed to correct the tool position along the Z axis, or performs the positional correction at the same time that the pick-feed operation is performed. The pulse distributor 22 then uses the values X', Y' to move the center of the tool along a path spaced a distance r' outwardly from the commanded path in the X-Y plane. It should be noted that while the data specifying the particular contour (namely the commanded tool path) does not contain data indicating a component along the Z axis, the pick-feed quantity does include a Z-axis component. If we let the Z-axis component be represented by Zp, then the corrected amount of movement Z' along the Z axis will be given by:

$$Z' = Zp + l \qquad \ldots (3)$$

The pick-feed operation is performed based on Z'.

According to the present invention as described and illustrated hereinabove, programming is simplified and does not require use of an automatic programming apparatus because it is unnecessary to specify compensation direction in each block of numerical control data in cases where the machined surface of the workpiece has a constant inclination.

As many apparently widely different embodiments of the present invention can be made without departing from the spirit and scope thereof, it is to be understood that the invention is not limited to the specific embodiments thereof except as defined in the appended claims.

What we claim is:

1. An apparatus for tool radius compensation in three-dimensional machining of a workpiece where a tool is offset from a commanded tool path by a distance commensurate with the radius of the tool, comprising:

command means for producing command signals in first, second and third dimensions, with a workpiece contour being commanded in first and second dimensions as a tool path in a prescribed plane sectioning the workpiece;

means for providing tool radius and inclination of a machined surface of the workpiece;

means for computing a first tool offset quantity in the prescribed plane and a second tool offset quantity in a direction at right angles to the prescribed plane, based on the radius of the tool and the inclination of the machined surface;

two-dimensional tool radius compensation means which receives the first and second dimension command signals from said command means for effecting tool radius compensation in the prescribed plane by correcting the first and second dimension command signals based on first tool offset quantity, and for outputting the corrected first and second dimension command signals;

third dimension tool radius compensation means for correcting tool position in a direction at right angles to the prescribed plane by correcting the third dimension command signal from said command means based on the second tool offset quantity, and for outputting a corrected third dimension command signal; and means for machining the workpiece in three dimensions based on the corrected first and second dimension signals from said two-dimensional tool radius compensation means and the corrected third dimension signal from said third dimension tool radius compensation means.

2. The apparatus according to claim 1, wherein said means for computing the first and second tool offset quantities comprises arithmetic means for performing the operations:

$$r' = r \cdot \cos\theta$$

$$l = r \cdot \sin\theta$$

where
r: tool radius
$\theta$: inclination
r': first tool offset quantity
l: second tool offset quantity 3. A method of compensating for tool radius in three-dimensional machining of a workpiece where a tool is offset from a commanded tool path by a distance commensurate with the radius of the tool, comprising the steps of:

commanding a workpiece contour as a tool path in a prescribed plane sectioning the workpiece;

providing a tool radius and inclination of a machined surface of the workpiece;

computing a first tool offset quantity in the prescribed plane and a second tool offset quantity in a direction at right angles to the prescribed plane, based on the radius of the tool and the inclination of the machined surface;

compensating for the tool radius in the prescribed plane based on the first tool offset quantity;

correcting a tool position in a direction at right angles to the prescribed plane based on the second tool offset quantity; and machining the workpiece in three dimensions based on the compensated tool radius in the prescribed plane and the corrected tool position in the direction at right angles to the prescribed plane.

* * * * *

UNITED STATES PATENT AND TRADEMARK OFFICE
CERTIFICATE OF CORRECTION

PATENT NO. : 4,572,998
DATED : February 25, 1986
INVENTOR(S) : RYOICHIRO NOZAWA ET AL.

It is certified that error appears in the above—identified patent and that said Letters Patent is hereby corrected as shown below:

Col. 1, line 31, "workiece" should be --workpiece--.

Col. 5, line 2, delete "the".

Signed and Sealed this

Twenty-fourth Day of June 1986

[SEAL]

Attest:

DONALD J. QUIGG

Attesting Officer     Commissioner of Patents and Trademarks